(12) United States Patent
Chauvet et al.

(10) Patent No.: US 11,801,745 B2
(45) Date of Patent: Oct. 31, 2023

(54) SEPARATING ELEMENT FOR AN ANTI-VIBRATION HYDRAULIC MODULE AND ANTI-VIBRATION HYDRAULIC MODULE EQUIPPED WITH SUCH A SEPARATING ELEMENT

(71) Applicant: Vibracoustic Nantes SAS, Carquefou (FR)

(72) Inventors: Ludovic Chauvet, Mauves sur Loire (FR); Julien Hervé, Sainte Luce sur Loire (FR); Florian Payen, Nantes (FR)

(73) Assignee: Vibracoustic Nantes SAS, Carquefou (FR)

( * ) Notice: Subject to any disclaimer, the term of this patent is extended or adjusted under 35 U.S.C. 154(b) by 387 days.

(21) Appl. No.: 17/104,468

(22) Filed: Nov. 25, 2020

(65) Prior Publication Data
US 2021/0155090 A1 May 27, 2021

(51) Int. Cl.
| | |
|---|---|
| *F16F 13/10* | (2006.01) |
| *B60K 8/00* | (2006.01) |
| *B62D 21/11* | (2006.01) |
| *B62D 27/04* | (2006.01) |
| *F16F 15/023* | (2006.01) |

(52) U.S. Cl.
CPC .............. *B60K 8/00* (2013.01); *B62D 21/11* (2013.01); *B62D 27/04* (2013.01); *F16F 13/107* (2013.01); *F16F 15/023* (2013.01)

(58) Field of Classification Search
CPC ....... F16F 13/105; F16F 13/106; F16F 13/107
See application file for complete search history.

(56) References Cited

U.S. PATENT DOCUMENTS

| | | | | |
|---|---|---|---|---|
| 4,925,162 A | * | 5/1990 | Kojima | F16F 13/106 267/140.13 |
| 5,028,038 A | * | 7/1991 | de Fontenay | F16F 13/262 180/312 |
| 5,571,263 A | * | 11/1996 | Koester | F16F 13/10 267/140.13 |

(Continued)

FOREIGN PATENT DOCUMENTS

| | | |
|---|---|---|
| EP | 3477149 A1 | 5/2019 |
| FR | 2898647 A1 | 9/2007 |

(Continued)

OTHER PUBLICATIONS

European Search Report, EP20209829, dated Apr. 12, 2021.

(Continued)

*Primary Examiner* — Thomas J Williams
(74) *Attorney, Agent, or Firm* — Fishman Stewart PLLC

(57) ABSTRACT

A separation element is configured to separate a working chamber from a compensation chamber of a hydraulic anti-vibration module for mounting an engine on a vehicle body. The separation element includes a first duct extending between a first mouth and a second mouth. In embodiments, the first mouth is provided in a first face of the separation element and is configured to be fluidically connected to the working chamber, and the second mouth is provided in a second face of the separation element and is configured to be fluidically connected to the compensation chamber. In embodiments, the first mouth includes a plurality of openings.

17 Claims, 3 Drawing Sheets

(56) References Cited

U.S. PATENT DOCUMENTS

| | | | |
|---|---|---|---|
| 7,802,777 B2 * | 9/2010 | Katayama | F16F 13/107 |
| | | | 267/140.13 |
| 2003/0080482 A1 * | 5/2003 | Desmoulins | F16F 13/106 |
| | | | 267/140.13 |
| 2010/0213650 A1 | 8/2010 | Katayama | |
| 2016/0053845 A1 | 2/2016 | Ueki et al. | |
| 2018/0073591 A1 * | 3/2018 | Nagasawa | F16F 13/107 |
| 2019/0017567 A1 * | 1/2019 | Kim | F16F 13/105 |
| 2021/0155090 A1 * | 5/2021 | Chauvet | B60K 8/00 |

FOREIGN PATENT DOCUMENTS

| | | | | |
|---|---|---|---|---|
| JP | 62242148 A | * | 10/1987 | ............ F16F 13/107 |
| KR | 1020130020499 A | * | 2/2013 | ............ F16F 13/107 |
| WO | 86/03813 A1 | | 7/1986 | |
| WO | WO-02052168 A1 | * | 7/2002 | ............ F16F 13/107 |
| WO | WO-2016175273 A1 | * | 11/2016 | ............ F16F 13/106 |

OTHER PUBLICATIONS

French Search Report, FR1913340, dated Aug. 31, 2020.
China Office Action for CN202011362284.0 dated Apr. 13, 2023 with translation (17 pages).

* cited by examiner

[Fig. 4]
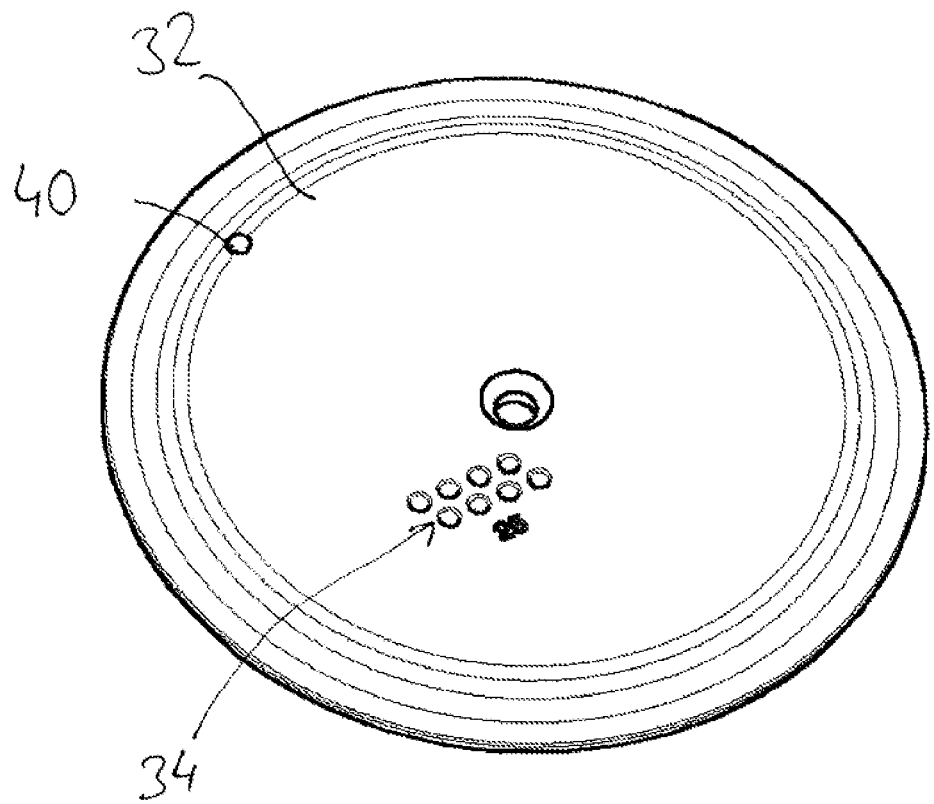
[Fig. 5]
--Prior Art--
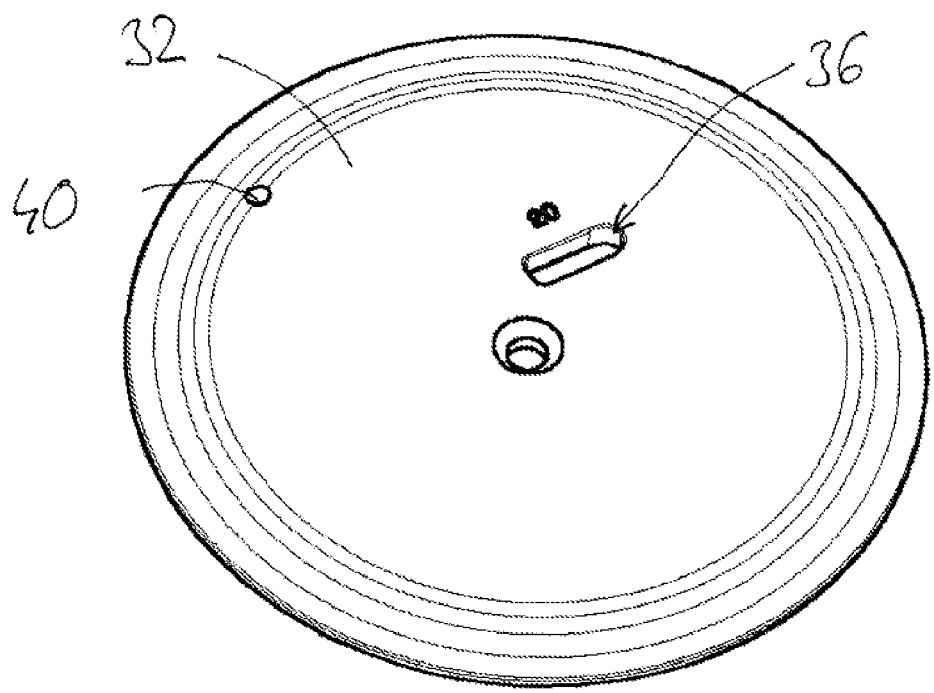

SEPARATING ELEMENT FOR AN ANTI-VIBRATION HYDRAULIC MODULE AND ANTI-VIBRATION HYDRAULIC MODULE EQUIPPED WITH SUCH A SEPARATING ELEMENT

CROSS-REFERENCE TO RELATED APPLICATIONS

This application claims priority to French Patent Application No. FR 1913340, filed Nov. 27, 2019, the contents of which are hereby incorporated by reference in its entirety.

TECHNICAL FIELD

The present disclosure relates to a separation element for a hydraulic anti-vibration module for mounting an engine on a vehicle body, and to a hydraulic anti-vibration module equipped with such a separation element.

BACKGROUND

Anti-vibration devices for mounting an engine on a vehicle body, comprising a first frame joined to a second frame by means of a hydraulic anti-vibration module that is able to deform at least along a main vibration axis, are known.

However, the known solutions perform only over a narrow range of vibration frequencies.

There is therefore a need to broaden the range of vibration frequencies that are damped, while maintaining satisfactory damping.

SUMMARY

One embodiment relates to a separation element configured to separate a working chamber from a compensation chamber of a hydraulic anti-vibration module configured for mounting an engine on a vehicle body, the separation element comprising a first duct extending between a first mouth and a second mouth, wherein the first mouth may be created in a first face of the separation element and may be configured to be fluidically connected to the working chamber, wherein the second mouth may be created in a second face of the separation element and may be configured to be fluidically connected to the compensation chamber, and wherein the first mouth may be divided into a plurality of openings.

In the present disclosure, a mouth corresponds to an inlet or an outlet of a passage that may be configured to convey a fluid. Depending on the direction of flow of the fluid, a mouth can equally be a fluid inlet or a fluid outlet.

The presence of a first mouth comprising a plurality of openings at the inlet of the first duct makes it possible to increase the fluid resistance and/or the friction at the first mouth (at hence the fluid resistance and/or the friction of the first duct) compared to a single opening of the prior art. Increasing the friction makes it possible on one hand to broaden the range of frequencies of the vibrations that are damped by the hydraulic damping module, and makes it possible on the other hand to reduce the amplitude of the maximum amplitude oscillations of the system observed at a given frequency of the oscillations of the fluid in the first duct. In other words, in comparison with a separation element of the prior art comprising a mouth comprising a single opening having a passage cross section greater than or equal to the plurality of openings according to the present disclosure, the range of frequencies of vibrations that are damped may be broadened, while retaining satisfactory damping over the entire range of frequencies of vibrations that are damped.

It has moreover been observed that, when the first mouth comprises a plurality of openings, bubbles generated by cavitation are split, by the plurality of openings of the first mouth, into a plurality of small bubbles. Thus, in the event of implosion, these smaller bubbles generate less noise/vibration than the implosion of larger bubbles, which are observed in prior art ducts.

Moreover, the implosion of the large bubbles generates vibrations across the whole spectrum of frequencies, since the resulting change in volume can be likened to a Dirac impulse, whose spectrum has a very broad range of excited frequencies. By contrast, the implosion of multiple small bubbles of different diameters excites different, more limited ranges of frequencies. As a result, these implosions of smaller cavitation bubbles generate less noise/vibration.

In certain embodiments, the first mouth may comprise a plate in which the plurality of openings may be created.

The first mouth can be produced separately from the separation element, by adding a plate into which the plurality of openings may be created. The openings may be identical in size and/or shape, but not necessarily. This makes it easier to adjust the range of frequencies of the vibrations that are damped, according to requirements.

In certain embodiments, the first mouth may comprise a grille.

The first mouth can be produced separately from the separation element, by adding a grille. This makes it easier to adjust the range of frequencies of the vibrations that are damped, according to requirements.

In certain embodiments, a second duct may extend between a third mouth, created in the first face of the separation element and configured to be fluidically connected to the working chamber, and a fourth mouth, created in the second face of the separation element and configured to be fluidically connected to the compensation chamber, wherein preferably the third mouth may comprise a single opening, and wherein more preferably a diameter of the opening of the third mouth is larger than a diameter of any one of the openings of the first mouth.

When a low-friction duct (second duct) is combined with a higher-friction duct (first duct), it is possible to increase the level of damping, while increasing the range of frequencies of the vibrations that are damped.

In certain embodiments, the second mouth and/or the fourth mouth each comprise a single (i.e. a unique) opening.

In certain embodiments, the separation element may comprise a main body and a lid, wherein the first duct and/or the second duct are channels created in a first face of the main body, and wherein more preferably the channels are covered by the lid.

The separation element may be produced more simply. Indeed, producing a main body comprising channels and a lid covering these channels makes it easier to produce the first duct and the second duct, while retaining a first duct and a second duct in the shape of a pipe when the cover is fitted onto the main body. This approach is less technically restrictive than the design of a main body having within it a first duct and a second duct in the form of a pipe, these being entirely bored within the main body. This also makes it easier to adjust the damping.

In certain embodiments, the first mouth and/or the third mouth is/are created in the lid, wherein preferably the second mouth and/or the fourth mouth is/are fluidically connected to a through-hole extending from a second face of the main body to the first/second duct, respectively.

A lid of this kind makes it easier to produce and assemble the separation element, and makes it easy to adjust the damping according to the design of the mouths on the lid.

In certain embodiments, the lid may be circular in shape and preferably a first element among the main body or the lid includes a recess and the second element among the main body and the lid includes a projection that matches the recess.

The recess can be provided on the lid or on the main body, while the projection can respectively be provided on the main body or the lid. This system may form a poka-yoke system, which may guarantee proper mounting of the lid on the main body, such that the mouths are positioned correctly with respect to the ducts. Thus, the damping can be made more reliable.

In certain embodiments, at least one portion of the first duct may extend in a straight line and parallel to at least one portion of the second duct, wherein preferably at least one portion of the first duct may be arranged between two portions of the second duct, and/or wherein more preferably at least one portion of the second duct may be arranged between two portions of the first duct.

In other words, the first and second duct can be intertwined, without intersecting, inside the separation element. This make it possible to optimize the total length of the ducts with respect to the space provided by the main body. For example, the ducts may have a spiral shape, serving to maximize the length of the straight-line portions and/or the total length of the ducts within the smallest possible space, while matching these lengths to the ranges of frequencies that are to be damped.

One embodiment also relates to a hydraulic anti-vibration module configured for mounting an engine on a vehicle body, comprising a working chamber, a compensation chamber, and a separation element according to any one of the embodiments described in the present disclosure, wherein the separation element separates the compensation chamber and the working chamber.

BRIEF DESCRIPTION OF THE DRAWINGS

The invention and its advantages will be better understood upon reading the following detailed description of various embodiments of the invention, provided by way of non-limiting examples. This description refers to the appended pages of figures, in which:

FIG. 4 shows a first variant of the lid of FIG. 3.

FIG. 5 shows a lid of a separation element known from the prior art.

DETAILED DESCRIPTION

Figure 1:
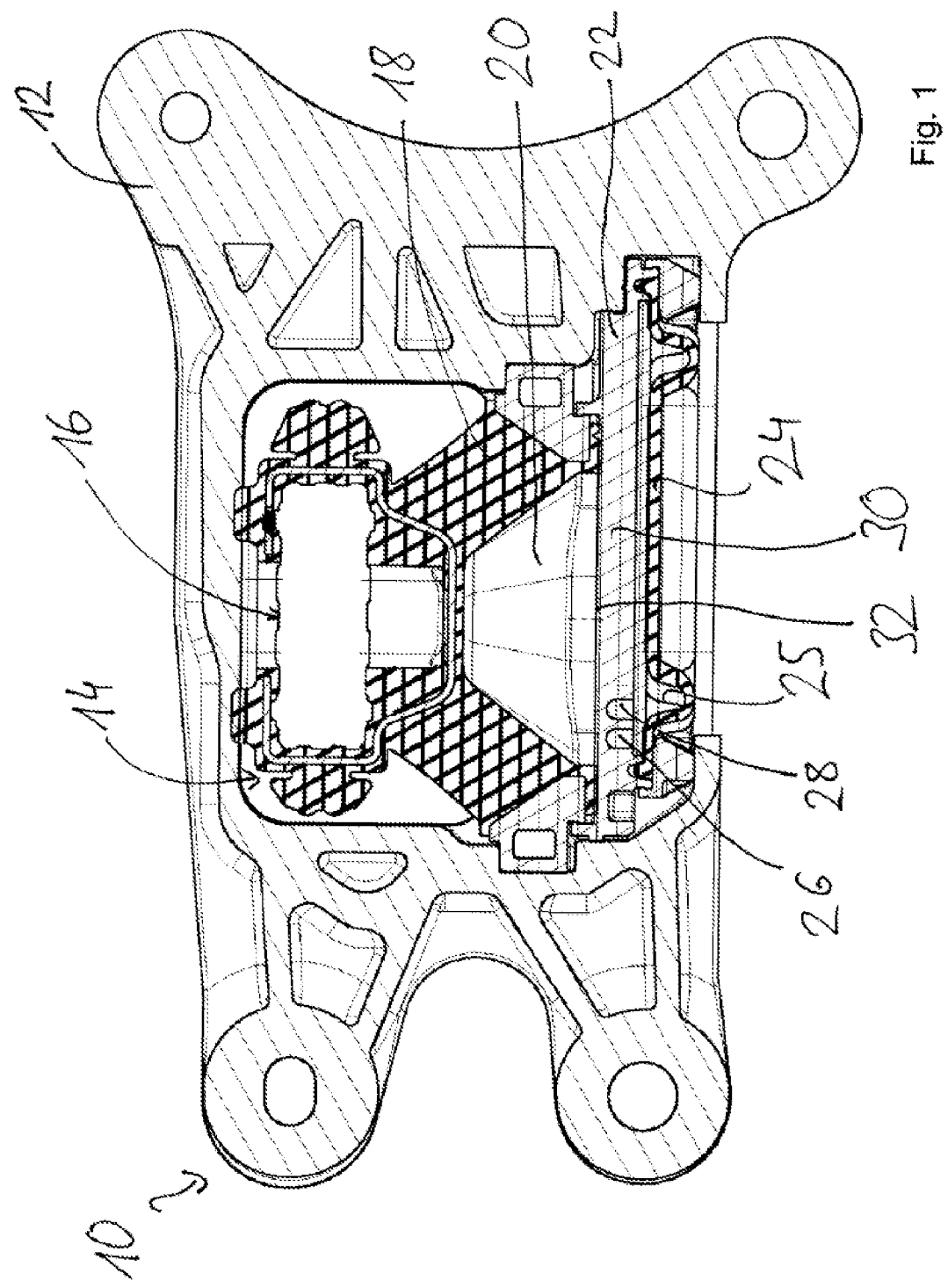
FIG. 1 shows a view in section of an embodiment of an anti-vibration device.

FIG. 1 shows a view in section of an anti-vibration device 10 according to one embodiment. The anti-vibration device 10 comprises a support 12 comprising a recess for receiving a hydraulic anti-vibration module 14. The hydraulic anti-vibration module 14 is also known to those skilled in the art as a "hydromodule" or a "hydromount". The support 12 is intended to be fastened to a vehicle body or chassis. The hydraulic anti-vibration module 14 may comprise a fastening means 16 to which the vehicle engine can be fastened. In the embodiment of FIG. 1, the fastening means 16 comprises a cavity.

The hydraulic anti-vibration module 14 has a configuration that is generally known. As shown in FIG. 1, the fastening means 16 may be borne by an elastic body 18, for example made of elastomer material, delimiting at least in part a working chamber 20. A separation element 22 may be fastened to the elastic body 18. A compensation membrane 24 may be fastened to the separation element 22. The compensation membrane 24 may be flexible but cannot stretch, and at least partially delimits a compensation chamber 25.

The working chamber 20 may be delimited by the elastic body 18 and the separation element 22. The compensation chamber 25 may be delimited by the separation element 22 and the compensation membrane 24.

The working chamber 20 and the compensation chamber 25 may be connected to one another by a first duct 26 and a second duct 28. Thus, when forces act on the elastic body 18, the volume of the working chamber 20 may be reduced owing to compression of the elastic body 18, such that a hydraulic fluid present in the working chamber 20 flows via the first duct 26 and/or the second duct 28 towards the compensation chamber 25, and vice versa.

Figure 2:
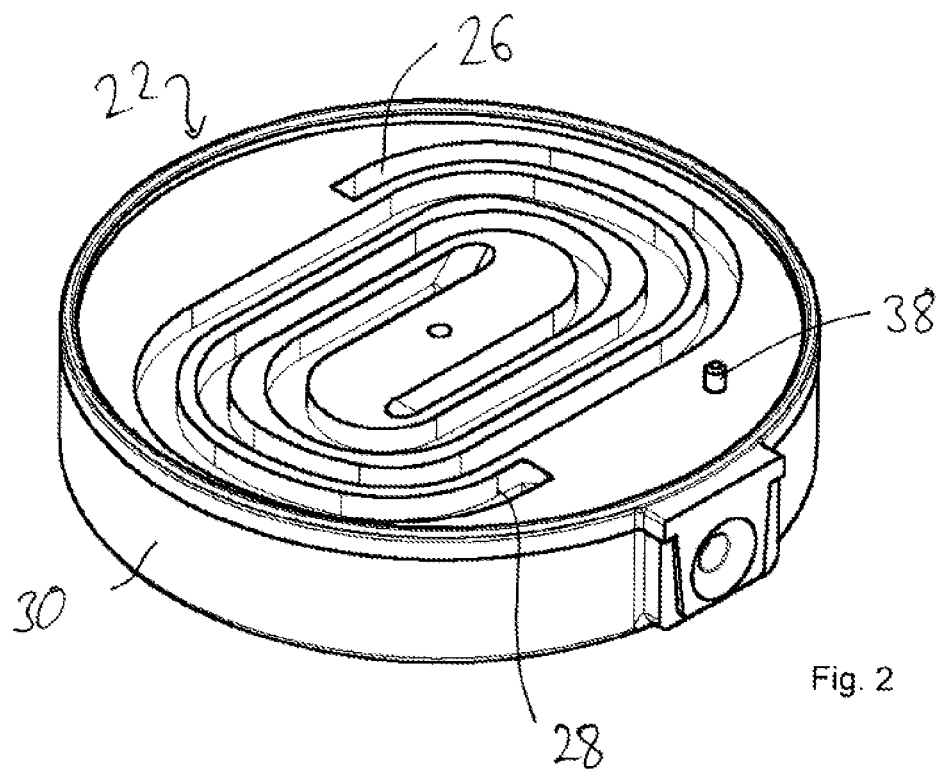
FIG. 2 shows the main body of the separator of the embodiment of FIG. 1.
Figure 3:
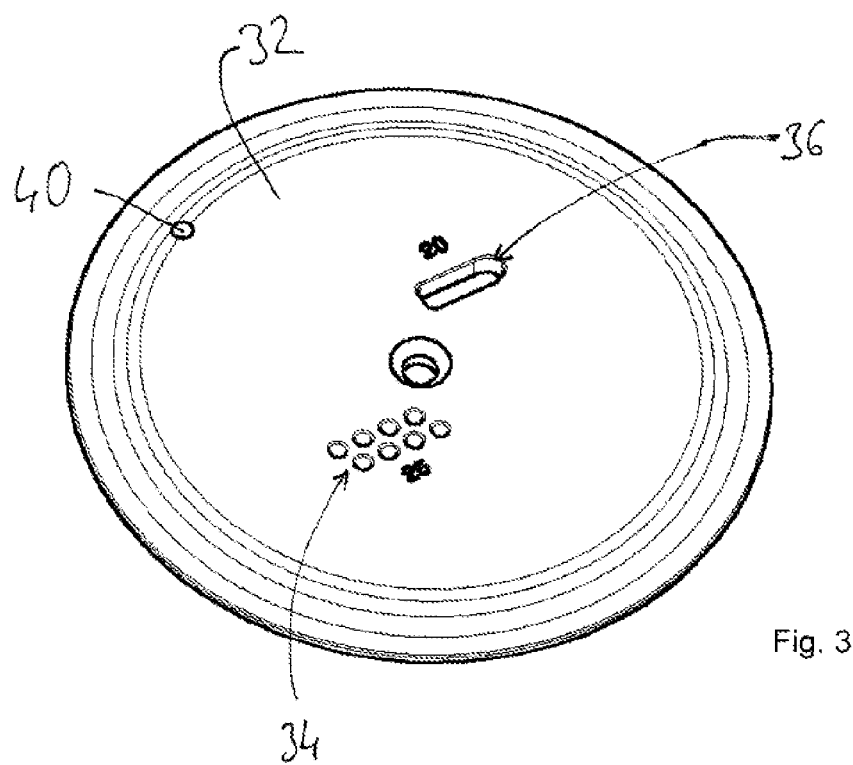
FIG. 3 shows the lid of the separator of the embodiment of FIG. 1.

The configuration of the separation element 22 can be seen more clearly in FIGS. 2 and 3. The separation element 22 may be generally cylindrical, the cylinder having a diameter, an axial direction and a circumferential direction. The separation element may comprise a main body 30 in which the first duct 26 and the second duct 28 extend.

The first duct 26 and the second duct 28 may extend in a spiral shape, centred on the axis of the separation element 22. More specifically, long portions (representing at least 30% of the diameter of the separation element) of the first duct 26 and of the second duct 28 extend parallel to one another, such that at least one portion of the first duct 26 may be arranged between two portions of the second duct 28. Conversely, at least one portion of the second duct 28 may be arranged between two portions of the first duct 26. Moreover, at least one portion of the first duct 26 may extend in a straight line and parallel to at least one portion of the second duct 28. In particular, the straight-line portion may also be arranged as described above, that is to say between two respective portions of the other duct 26 or 28.

The first duct 26 and the second duct 28 may establish a fluid connection between the working chamber 20 and the compensation chamber 25. To that end, the first duct 26 may comprise a first mouth 34 and a second mouth. The first mouth 34 may correspond to the inlet into the first duct 26 from the working chamber 20 whereas the second mouth may correspond to the inlet into the compensation chamber 25 from the first duct 26. The second duct 28 may comprise a third mouth 36 and a fourth mouth. The third mouth may correspond to the inlet into the second duct 28 from the working chamber 20 whereas the fourth mouth may correspond to the inlet into the compensation chamber 25 from the second duct 28.

Thus, the first mouth 34 and the third mouth 36 may be arranged on a first face of the separation element 22 which faces the working chamber 20. The second mouth and the fourth mouth may be arranged on a second face of the separation element 22 which faces the compensation chamber 25. The second mouth and the fourth mouth may be respectively arranged at the outlet of the first duct 26 and of the second duct 28.

The first duct 26 and the second duct 28 may comprise channels carved out of the main body 30, and may open onto the first face. In particular, the channels may have a rectangular cross section in a plane of section perpendicular to the plane of the first face and including the axis of the main body 30. In order for the first duct 26 and the second duct 28 to have a tube structure, the channels may be closed by the lid 32. Thus, the lid 32 may be arranged in line with the first face of the main body 30. However, it is possible for the first duct 26 and the second duct 28 to be bored entirely in the main body 30, with an identical tube structure, without the lid 32 closing this structure.

In this embodiment, the first mouth 34 and the third mouth 36 may comprise openings provided in the lid 32. More generally, the first mouth 34 and the third mouth may comprise a plate. This plate may be a perforated plate which comprises a plurality of openings. In certain configurations, this plate may be replaced with a grille.

The second and fourth mouths may be provided on the main body 30.

As shown in FIG. 3, the first mouth 34 may comprise a plurality of small openings whereas the third mouth 36 may consist of a single large opening. In this embodiment, the first mouth 34 comprising a plurality of openings may replace a known prior art inlet of the first duct 26 comprising a single opening (for example comparable to that of the third mouth 36). This can be brought about by producing a plurality of small openings arranged at the position of the first prior art mouth, for example bored in the lid 32. In this embodiment, the diameter of the opening of the third mouth 36 is larger than the diameter of any one of the openings of the first mouth 34.

In certain embodiments, instead of a plurality of openings arranged in the lid 32, the first mouth 34 may comprise a large opening, for example similar to that of the third mouth 36, that is covered by a grille.

The second mouth and the fourth mouth may comprise a large opening, for example similar to that of the third mouth.

Thus, the first duct 26 being alone covered by the lid 32 according to this embodiment makes it possible to satisfy the imposed technical constraints. In particular, it is possible to use a lid 32, such as illustrated in FIG. 4, that does not comprise a third mouth 36 and that comprises only the first mouth 34. In this case, it is possible to omit the second duct 28.

The lid 32 may also be circular in shape, as is the main body 30 with which the lid 32 cooperates. In the example of the embodiment of FIGS. 3, 4 and 5, a recess 40 may be arranged on the lid 32 and a projection 38 may be arranged on the main body 30. The projection 38 and the recess 40 may be configured to cooperate by virtue of matching shapes. In the event of the main body 30 and/or the lid 32 being non-circular, the orientation can be ensured in other ways, in configurations in which the recess 40 and the projection 38 are not necessary.

Although the present invention has been described with reference to specific embodiments, it is clear that modifications and changes to these examples can be made without departing from the general scope of the invention as defined by the claims. In particular, individual features of the various embodiments illustrated/mentioned can be combined in additional embodiments. Consequently, the description and the drawings must be considered as being illustrative rather than restrictive.

It is also clear that all of the features described with reference to a method can be transposed, either singly or in combination, to a device, and, vice versa, all the features described with reference to a device can be transposed, either singly or in combination, to a method.

The invention claimed is:

1. A separation element configured to separate a working chamber from a compensation chamber of a hydraulic anti-vibration module configured for mounting an engine on a vehicle body, comprising:
   a first duct extending between a first mouth and a second mouth, and a second duct extending between a third mouth and a fourth mouth,
   wherein the first mouth is provided in a first face of the separation element and is configured to be fluidically connected to the working chamber; the second mouth is provided in a second face of the separation element and is configured to be fluidically connected to the compensation chamber, and the first mouth comprises a plurality of openings
   wherein the first duct and the second duct extend in a spiral shape, centered on the axis of the separation element, and
   wherein the first duct and the second duct have long portions that extend parallel to one another, such that at least one portion of the first duct is arranged between two portions of the second duct and at least one portion of the second duct is arranged between two portions of the first duct.

2. The separation element according to claim 1, wherein the first mouth comprises a plate in which the plurality of openings is provided.

3. The separation element according to claim 1, wherein the first mouth comprises a grille.

4. The separation element according to claim 1, including a second duct extending between a third mouth and a fourth mouth,
   wherein the third mouth is arranged on the first face of the separation element and is configured to be fluidically connected to the working chamber, and the fourth mouth is arranged on the second face of the separation element and is configured to be fluidically connected to the compensation chamber.

5. The separation element according to claim 4, wherein the third mouth comprises a single opening.

6. The separation element according to claim 5, wherein a diameter of the opening of the third mouth is larger than a diameter of any one of the plurality of openings of the first mouth.

7. The separation element according to claim 4, wherein the second mouth and/or the fourth mouth each comprise a single opening.

8. The separation element according to claim 4, including a main body and a lid, wherein the first duct and/or the second duct comprise channels provided in a first face of the main body, and the channels are covered by the lid.

9. The separation element according to claim 4, wherein at least one portion of the first duct extends in a straight line and parallel to at least one portion of the second duct.

10. The separation element according to claim 9, wherein at least one portion of the first duct is arranged between two portions of the second duct.

11. The separation element according to claim 9, wherein at least one portion of the second duct is arranged between two portions of the first duct.

12. The separation element according to claim 11, wherein at least one portion of the first duct is arranged between two portions of the second duct.

13. The separation element according to claim 1, wherein the second mouth comprises a single opening.

14. The separation element according to claim 1, including a main body and a lid.

15. The separation element according to claim 14, wherein the lid is circular in shape, and a first element among the main body or the lid includes a recess and a second element among the main body or the lid includes a projection that matches the recess.

16. A hydraulic anti-vibration module configured for mounting an engine on a vehicle body, comprising:
 a working chamber,
 a compensation chamber, and
 a separation element according to claim 1,
 wherein the separation element separates the compensation chamber and the working chamber.

17. A hydraulic anti-vibration module configured for mounting an engine on a vehicle body, the hydraulic anti-vibration module comprising:
 a working chamber,
 a compensation chamber, and
 a separation element separates the compensation chamber and the working chamber, the separation element including a first duct and a second duct,
 wherein the first duct extends between a first mouth and a second mouth; the first mouth includes a plurality of openings, is provided in a first face of the separation element, and is configured to be fluidically connected to the working chamber; the second mouth is provided in a second face of the separation element and is configured to be fluidically connected to the compensation chamber; the second duct extends between a third mouth and a fourth mouth; the third mouth is arranged on the first face of the separation element and is fluidically connected to the working chamber; the fourth mouth is arranged on the second face of the separation element and is fluidically connected to the compensation chamber; the first duct and the second duct extend in a spiral shape, centered on the axis of the separation element; and the first duct and the second duct have long portions that extend parallel to one another, such that at least one portion of the first duct is arranged between two portions of the second duct and at least one portion of the second duct is arranged between two portions of the first duct.

* * * * *

UNITED STATES PATENT AND TRADEMARK OFFICE
CERTIFICATE OF CORRECTION

| | |
|---|---|
| PATENT NO. | : 11,801,745 B2 |
| APPLICATION NO. | : 17/104468 |
| DATED | : October 31, 2023 |
| INVENTOR(S) | : Ludovic Chauvet et al. |

It is certified that error appears in the above-identified patent and that said Letters Patent is hereby corrected as shown below:

On the Title Page

Please add:
"Foreign Application Priority Data
November 27, 2019 (FR)... ....................... 1913340"

Signed and Sealed this
Thirtieth Day of April, 2024

*Katherine Kelly Vidal*

Katherine Kelly Vidal
*Director of the United States Patent and Trademark Office*